(12) United States Patent
Block

(10) Patent No.: US 8,837,569 B2
(45) Date of Patent: Sep. 16, 2014

(54) DECISION FEEDBACK EQUALIZATION WITH SELECTABLE TAP

(75) Inventor: David Joseph Block, Pleasanton, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 172 days.

(21) Appl. No.: 13/566,425

(22) Filed: Aug. 3, 2012

(65) Prior Publication Data

US 2014/0036985 A1 Feb. 6, 2014

(51) Int. Cl.
*H03H 7/30* (2006.01)
(52) U.S. Cl.
USPC ........................................................... 375/233
(58) Field of Classification Search
CPC ................... H04L 25/03019; H04L 25/03025; H04L 25/03044; H04L 25/03057; H04L 25/03063

USPC .................................................. 375/232, 233
See application file for complete search history.

(56) References Cited

U.S. PATENT DOCUMENTS

| 5,594,756 | A | 1/1997 | Sakurai et al. |
| 2008/0069199 | A1 | 3/2008 | Chen et al. |
| 2009/0016422 | A1 | 1/2009 | Zhong et al. |
| 2011/0106052 | A1 | 5/2011 | Chiang et al. |

OTHER PUBLICATIONS

International Search Report and Written Opinion correlating to PCT/US2013/052839 dated Nov. 11, 2013, 12 pages.

*Primary Examiner* — Kevin Kim

(57) ABSTRACT

A system generates a set of candidate signals based on a received signal, whereby each candidate signal represents an adjustment of the signal for a different amount of potential noise. The system selects one of the candidate signals based on a selected subset of previous samples and the values of the selected subset of samples. The subset of previous samples is selected based on a predicted noise pattern.

20 Claims, 5 Drawing Sheets

DECISION FEEDBACK EQUALIZATION WITH SELECTABLE TAP

BACKGROUND

1. Field of the Disclosure

The present disclosure generally relates to signal noise reduction, and more particularly to decision feedback equalization.

2. Description of the Related Art

In a serial communication system, such as a graphics processing unit (GPU) memory interface, an information signal is transmitted through a medium, received, and processed. The received information signal has typically been degraded by all the media through which it has passed, including the transmitter, the transmission medium, the package, the receiver, and other media. The degradation can result from a variety of noise sources, including intersymbol interference (ISI), cross-talk, transmission reflections, and the like. The degradation in the received information signal can cause difficulty in extracting the transmitted information, putting limitations on the frequency of transmission, the transmission distance, and/or adding to the complexity, area, and power of the receiving circuitry.

There are multiple techniques for correcting, or reducing, the degradation in the received information signal. One such technique is referred to as decision feedback equalization (DFE). When a step or a pulse is transmitted, the effects of the noise sources can last for a short duration or for long periods of time, thereby affecting subsequent steps or pulses. For example, a transmitted pulse (corresponding to a digital value of "1"), may cause noise that interferes with subsequent transmitted data. Thus, a transmitted digital value of "1" can cause a subsequent transmitted digital value of "0" to erroneously appear as a digital value of one in the received signal. A DFE system can cancel or reduce the noise caused by previously transmitted values, thereby improving the accuracy of information retrieved from the received signal.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

FIGS. 1-5 illustrate example techniques for employing selectable taps in a decision feedback equalization (DFE) system to improve recovery of transmitted symbols from a received information signal. The DFE system generates a set of candidate signals based on the received information signal, whereby each candidate signal represents an adjustment of the information signal for a different amount of potential noise. The DFE system selects one of the candidate signals based on 1) a selected subset of previous samples and 2) the values of the selected subset of samples. The subset of previous samples is selected based on a predicted noise pattern, which can vary based on characteristics of the transmission medium of the information signal, characteristics of the transmitting and receiving modules, and the like. The DFE system determines the next sample in the sequence by determining a digital value of the information signal at a time indicated by a clock signal. Thus, the DFE system determines a sequence of samples based on the candidate signals that best ameliorate degradation in the received information signal. The sequence of samples therefore more accurately corresponds to the transmitted symbols, improving information recovery. In addition, because the subset of previous samples is selectable, the DFE system can be adapted to different noise conditions, improving system flexibility.

Figure 1:
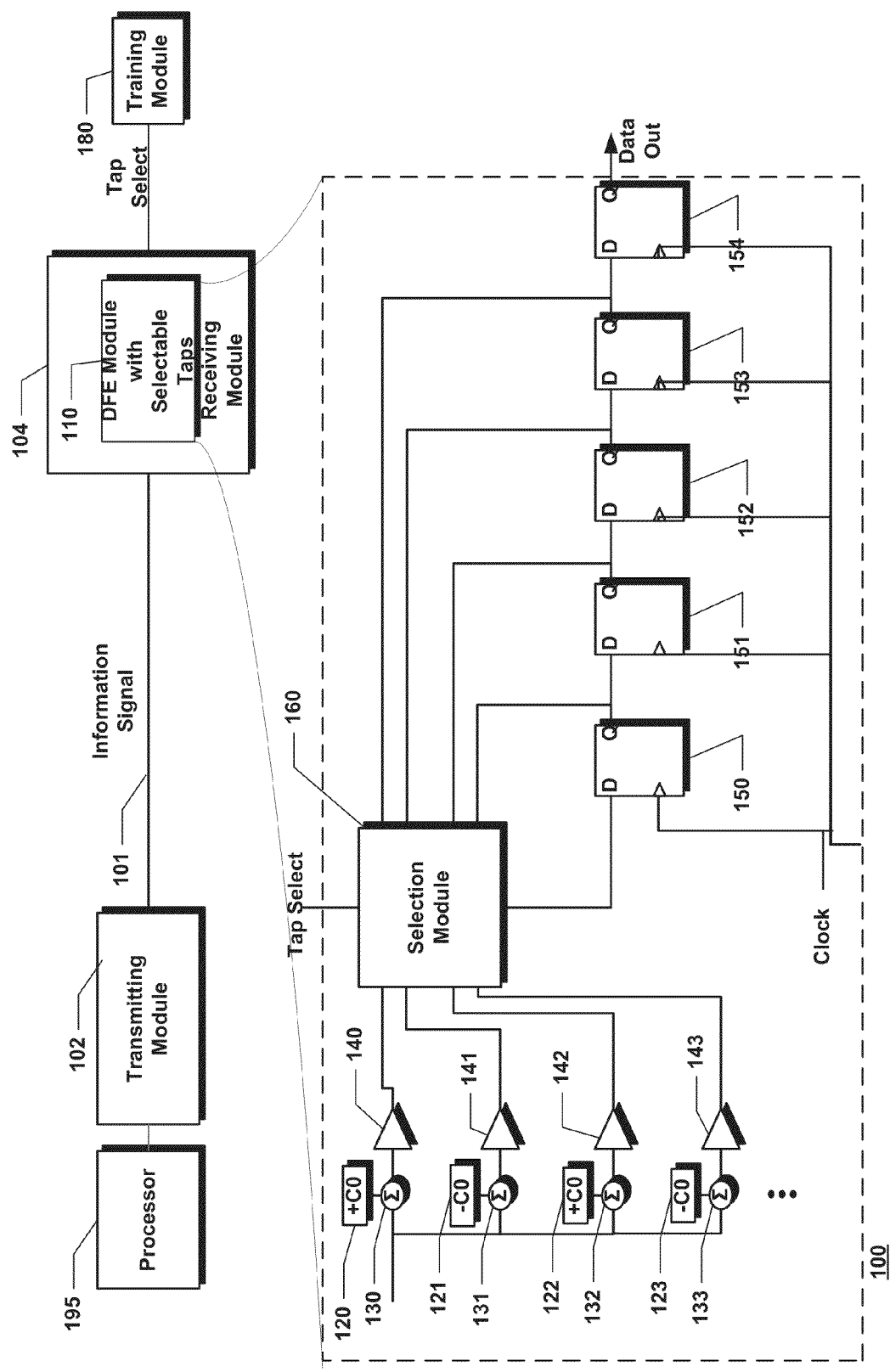
FIG. 1 is a block diagram of an electronic device employing a decision feedback equalization (DFE) module having a selectable tap in accordance with some embodiments of the present disclosure.

FIG. 1 illustrates a block diagram of an electronic device 100 having a DFE system in accordance with some embodiments of the present disclosure. The electronic device 100 includes a transmitting module 102 that communicates information, via an information signal 101, to a receiving module 104. In an embodiment, the electronic device 100 is a data processor, the transmitting module 102 is a memory device, and the receiving module 104 is a graphics processing unit (GPU) memory interface.

The information signal 101 communicates units of information serially. Each unit of information to be communicated is referred to as a symbol. For ease of discussion, each symbol is assumed to represent a single digital bit of information. Thus, each symbol can have a value of 0 or 1. The transmitting module 102 generates the information signal 101 such that each symbol being communicated is represented by the amplitude of the information signal 101 for a particular length of time. The length of time associated with communication of a particular symbol is referred to as its symbol time.

The receiving module 104 determines the symbols from the information signal 101 by 1) generating a set of candidate signals based on the information signal 101; 2) selecting the candidate signal associated with the expected noise pattern experienced by the information signal 101; and 3) sampling the selected candidate signal. To illustrate, the receiving module 104 includes a DFE module 110 with selectable taps. The DFE module 110 includes a set of adjustment modules 120-123, a set of summers 130-133, a set of gain module 140-143, a selection module 160, and a set of latches 150-154.

The summer 130 includes a terminal to receive the information signal 101, a terminal connected to the adjustment module 120, and a terminal connected to the gain module 140. The summer 131 includes a terminal to receive the information signal 101, a terminal connected to the adjustment module 121, and a terminal connected to the gain module 141. The summer 132 includes a terminal to receive the information signal 101, a terminal connected to the adjustment module 122, and a terminal connected to the gain module 142. The summer 133 includes a terminal to receive the information signal 101, a terminal connected to the adjustment module 123, and a terminal connected to the gain module 143.

The latches 150-154 each include clock inputs to receive a clock signal labeled Clock. In addition, the latches 150-154 are connected such that they form a shift register. In particular, the latch 150 includes a data input connected to an output of the selection module 160 and a data output. The latch 151 includes a data input connected to the data output of the latch 150 and a data output. The latch 152 includes a data input connected to the data output of the latch 151 and a data output. The latch 153 includes a data input connected to the data output of the latch 152 and a data output. The latch 154 includes a data input connected to the data output of the latch 153 and a data output to provide a signal labeled Data Out to a downstream module (not shown). The latches 150-154 are configured such that, in response to assertion of the Clock signal, the digital value at each latch is shifted to the next latch in the sequence (e.g. the digital value stored at the latch 150 is shifted to the latch 151). In addition, the latch 150 latches a digital value provided at its input and the latch 154 provides its stored digital value via the signal Data Out to the downstream module.

The adjustment modules 120-123 and summers 130-133 are configured to generate a set of candidate signals. In particular, each of the adjustment modules 120-123 is configured to generate a signal, referred to as an adjustment signal, having a given amplitude. Each of the summers 130-133 is configured to combine its input adjustment signal with the information signal 101 to generate a candidate signal. Thus, each candidate signal represents the information signal 101 as adjusted by the associated adjustment signal.

Each of the adjustment modules 120-123 is configured to generate an adjustment signal that address a potential noise pattern associated with the information signal 101. To illustrate, the presence of noise can change, for a particular symbol time the amplitude of the received information signal 101 relative to the transmitted symbol. As described further herein, a symbol is retrieved by comparing the amplitude at the symbol time associated with the symbol to a threshold amplitude. Accordingly, changes in the amplitude of the received information signal can cause an erroneous value of a symbol to be retrieved. However, certain types of noise, such as ISI, are predictable. For example, a particular noise pattern may indicate that the transmission of a symbol (referred to as symbol N) having a value of 1 can cause a fixed amount of noise on the first, third, and sixth symbols following symbol N. If symbol N had a value of 0, the noise would not be present on the first, third and sixth symbols. Accordingly, in order to accurately retrieve a symbol, the fixed amount noise should be subtracted from a symbol (referred to as symbol M) if any of symbols M−1, M−3, or M−6 had a value of 1. Further, the particular symbols that cause ISI can vary based on changing conditions at the electronic device 101. Thus, in order to achieve accurate retrieval of the symbols, the noise that should be subtracted from the information signal 101 depends on the following variables: 1) which symbols cause ISI; and 2) the value of selected previous symbols. Each of the adjustment modules 120-123 is configured to generate an adjustment signal for a different set of these variables. Thus, for example, the following table indicates the noise expected for different sets of these variables, and the associated adjustment signal:

| Adjustment module | Selected symbols | Symbol Values | Expected noise | Adjustment signal amplitude |
| --- | --- | --- | --- | --- |
| 120 | 1, 4 | 00 | 0.2 | −0.2 |
| 121 | 1, 4 | 01 | 0.5 | −0.5 |
| 122 | 1, 4 | 10 | −0.4 | 0.4 |
| 123 | 1, 4 | 11 | 0.1 | −0.1 |

Thus, each of the adjustment modules 120-123 will generate an adjustment signal that, when combined with the information signal 101 by the corresponding summer 130-133, will generate a candidate signal. As described further herein, the candidate signal with the expected best quality (e.g., most noise removed) will be selected for sampling. The selection of the candidate signal is based upon the values of the selected previous samples that correspond to the selected symbols in the above table. It will be appreciated that the DFE module 110 can include additional adjustment modules and summers to address noise generated by other selected symbols and by other values of the symbols identified in the above table.

Each of the gain module 140-143 receives a corresponding input candidate signal and provides an amplified representation of the input candidate signal at its output. The outputs of the gain modules 140-143 are referred to as output candidate signals. The selection module 160 is configured to select one of the output candidate signals provided by the gain modules 140-144 based on the values of selected previous symbols. The selection module 160 provides the selected output candidate signal to the latch 150. The latch 150 samples the selected output candidate signal by determining a digital value for the signal in response to designated edges of the Clock signal. In particular, at times indicated by the designated edges, the latch 150 compares the candidate output signal to a threshold value and stores a digital value of 1 or 0 based on the comparison.

In addition, based on the edges of the clock signal, the samples are shifted sequentially to the latches 150-154. Thus, the latches 150-154 store a sequence of samples. Further, the Clock signal is generated such that each sample indicates the value of an associated symbol. Accordingly, the selection module 160 can use the outputs, or taps, of the latches 150-154 to determine the value of previous symbols of the information signal 101.

It will be appreciated that, if a sequence of samples was generated by a gain module based on the received information signal 101 alone, without the removal of noise, the sample sequence would be unlikely to accurately reflect the communicated symbol values. In particular, the perturbations in the amplitude of the information signal 101 resulting from the noise would cause the latch 150 to make erroneous decisions as to the value of particular symbols, so that the values of these symbols could not be accurately retrieved from the information signal 101. Accordingly, by generating the candidate signals, the symbols can be more accurately retrieved from the received information signal.

The selection module 160 selects particular subsets of samples to use based on a detected noise profile for the electronic device 100. As used herein, the use of a subset of samples refers to the use of some, but not all, of the samples in the sequence. The particular subset of samples to be used is selected to address predicted noise. To illustrate, the electronic device 100 includes a training module 180 that determines the noise pattern present at the information signal 101. The training module 180 can determine the noise pattern in a variety of ways. In some embodiments, the training module 180 can send test patterns via the information signal 101 and compare the symbols retrieved at the DFE module 110 to the test patterns. Differences between the test patterns and the retrieved symbols indicate the noise pattern. Based on the noise pattern, the training module 180 generates control signaling labeled Tap Select.

The detected noise pattern will indicate particular symbols and symbol values in a set sequence can cause ISI or other noise. For ease of discussion, the determined symbols are referred to as ISI symbols. As explained above, each of the latches 150-154 stores a sample associated with a corresponding symbol in the sequence. Accordingly, based on the determined noise pattern the training module 180, sets the state of the Tap Select signalling to select the subset of samples that correspond to the ISI symbols. The Tap Select is generated based on The selection module 160 uses the values of the selected sample subset to select the binary output signal from the gain module that receives the appropriate candidate signal.

For example, based on the table above, the selection module can select the output candidate signals of the gain modules 140-143 as follows:

| ISI symbols (sample subset) | Symbol Values | Selected gain module output |
|---|---|---|
| 1, 4 | 00 | 140 |
| 1, 4 | 01 | 141 |
| 1, 4 | 10 | 142 |
| 1, 4 | 11 | 143 |

Thus, the selection module selects the output candidate signal that best addresses the predicted noise, based on the determined noise pattern and the value of the ISI symbols.

In an embodiment, the adjustment modules 120-123 are programmable such that the amplitude of each of the corresponding adjustment signals can be set by programming one or more registers. The adjustment modules 120-123 are programmed by the training module 180 during training of the electronic device 100. For example, the amplitude for the adjustment signals can be set according to the predicted noise pattern to better ameliorate the predicted noise.

FIG. 1 illustrates that the transmitting module 102 is connected to a processor 195. In an embodiment, the transmitting module is a memory device such as a random access memory (RAM) device, a hard disk drive, flash memory, or the like, that stores sets of instructions arranged as programs. The processor 195 is configured to execute the instructions in order to carry out one or more of the methods described herein.

Figure 2:
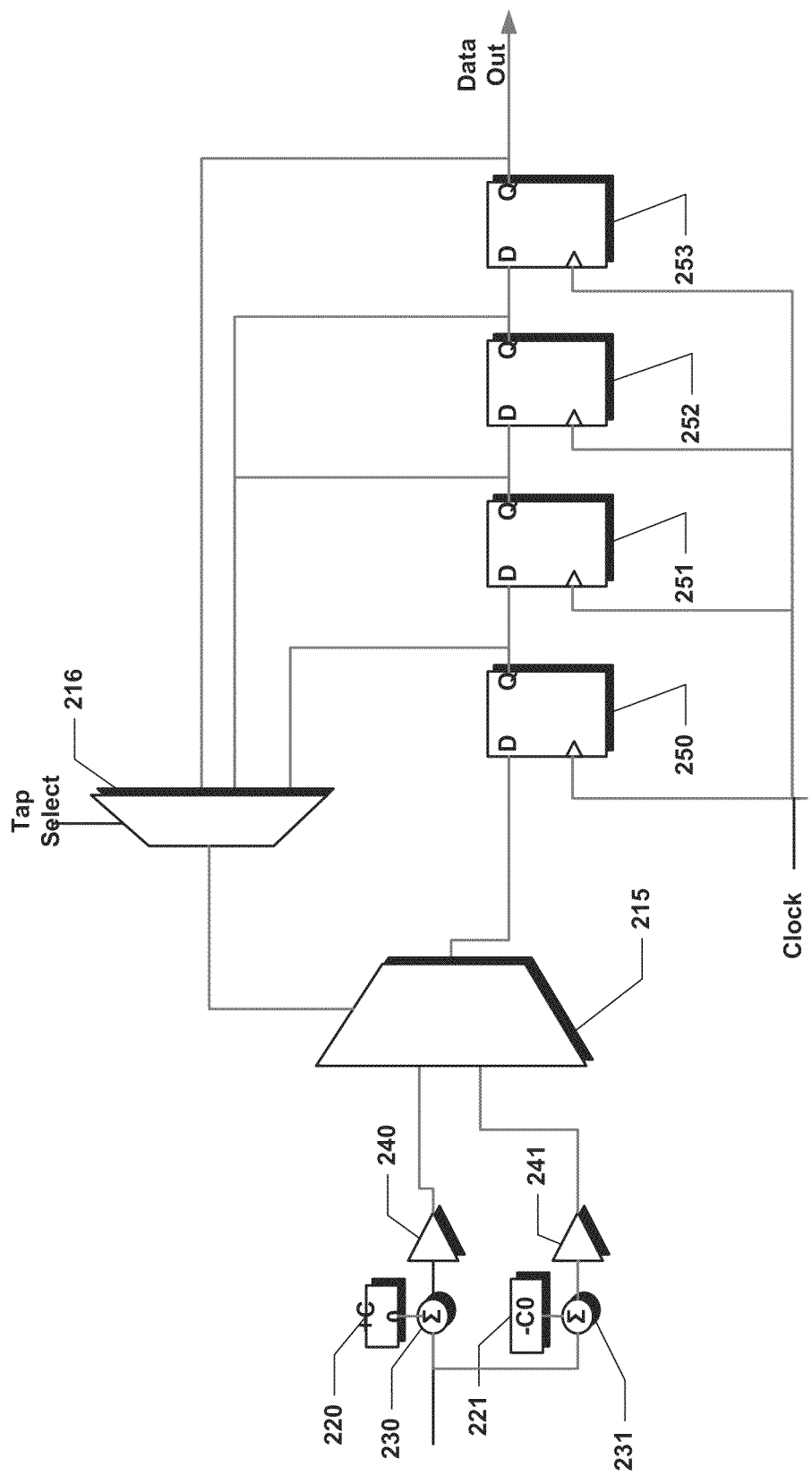
FIG. 2 is a block diagram of the DFE module of FIG. 1 in accordance with some embodiments of the present disclosure.

FIG. 2 is a block diagram of the DFE module 110 in accordance with some embodiments of the present disclosure. As illustrated in FIG. 2, the DFE module 110 includes adjustment modules 220 and 221, summers 230 and 231, gain modules 240 and 241, multiplexers 215 and 216, and latches 250-253. The summer 230 includes a terminal to receive the information signal 101, a terminal connected to the adjustment module 220, and a terminal connected to the gain module 240. The summer 231 includes a terminal to receive the information signal 101, a terminal connected to the adjustment module 221, and a terminal connected to the gain module 241. The multiplexer 215 includes inputs connected to the gain modules 240 and 241, a control input, and an output.

The latch 250 includes a data input connected to the output of the multiplexer 215, a data output, and a clock input to receive a clock signal. The latch 251 includes a data input connected to the data output of the latch 250, a data output, and a clock input to receive the clock signal. The latch 252 includes a data input connected to the data output of the latch 251, a data output, and a clock input to receive the clock signal. The latch 253 includes a data input connected to the data output of the latch 252, a data output to provide a signal labeled "Data Out", and a clock input to receive the clock signal. The multiplexer 216 includes data inputs connected to corresponding data outputs of the latches 250-253, an output connected to the control input of the multiplexer 215, and a control input to receive a signal labeled "Tap Select."

In FIG. 2, the multiplexers 215 and 216 correspond to the selection module 160 of FIG. 1. The multiplexer 216 receives the Tap Select signal that indicates one of latches 251-253. In response, the multiplexer 216 selects the output signal of the latch associated with the indicated sample. The selected subset of the sample sequence is thereby provided to the multiplexer 215 for selection of the appropriate adjusted information signal 101.

To illustrate, in operation the electronic device 100 undergoes a training procedure to determine the predicted noise pattern for the information signal 101. For the illustrated embodiment of FIG. 2, the noise pattern will indicate that one of the samples stored at the latches 250-253 corresponds to an ISI symbol. Accordingly, the electronic device 100 sets the Tap Select signal to the sample corresponding to the ISI symbol indicated by the training procedure. The selected sample subset therefore has only one set member. The multiplexer 215 will use the value of the selected sample to select between the output candidate signals provided by the gain modules 240 and 241. In particular, the multiplexer 215 will select the output candidate signal associated with the candidate signal that accounts for the noise predicted by the value of the selected sample. The DFE module 110 thereby ameliorates the predicted noise.

Figure 3:
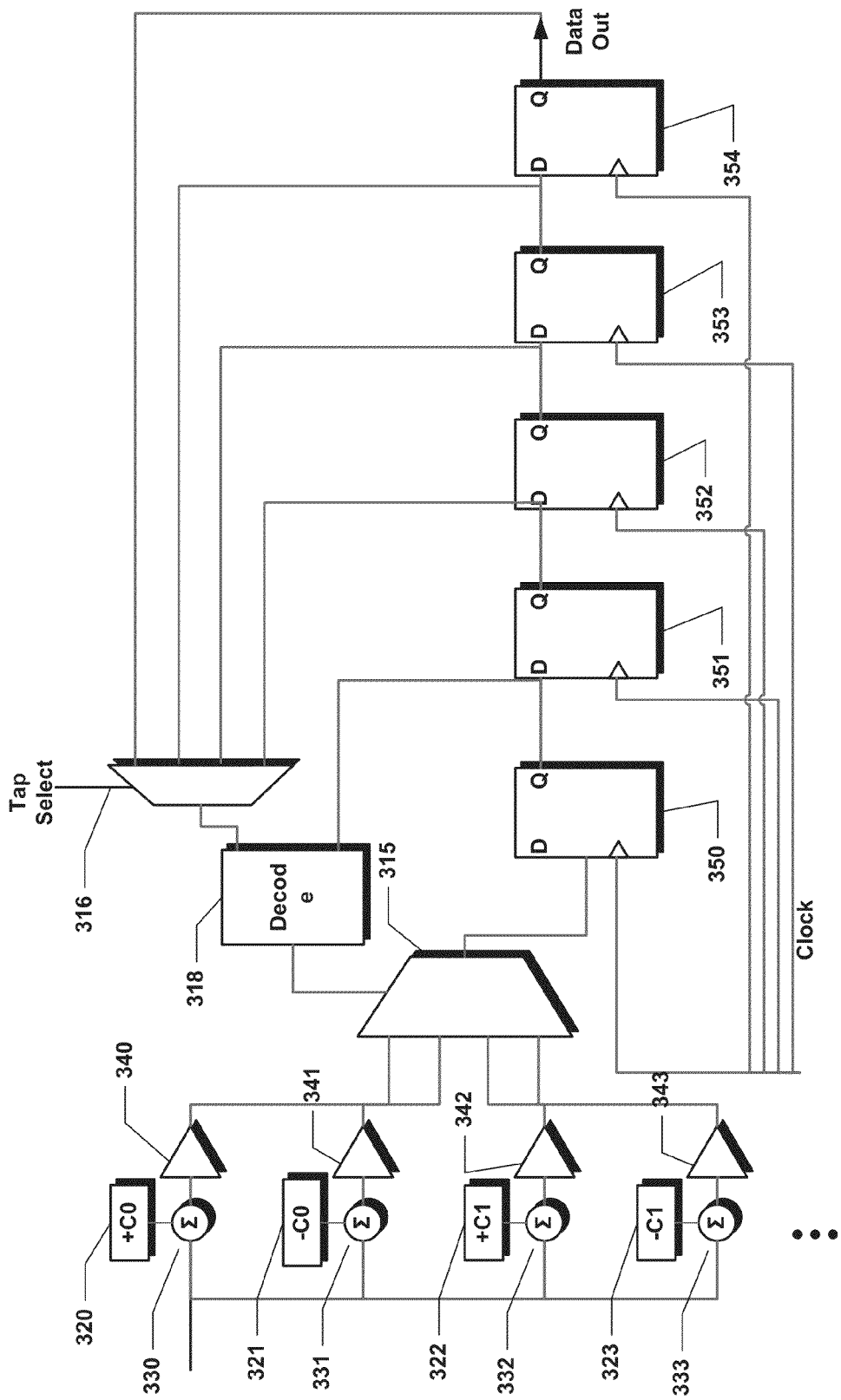
FIG. 3 is a block diagram of the DFE module of FIG. 1 in accordance with some embodiments of the present disclosure.

FIG. 3 illustrates the DFE module 110 in accordance with some embodiments of the present disclosure. As illustrated in FIG. 3, the DFE module 110 includes a fixed tap, the output of the latch 350, that is used for every predicted noise pattern. In addition, the DFE module 110 includes a variable tap that selects from among the outputs of the latches 350-353 depending on the noise pattern indicated by the Tap Select signal.

In FIG. 3, the DFT module 110 includes adjustment modules 320-323, summers 330-333, gain modules 340-343, multiplexers 315 and 316, latches 350-353, and decode module 318. The summer 330 includes a terminal to receive the information signal 101, a terminal connected to the adjustment module 320, and a terminal connected to the gain module 340. The summer 331 includes a terminal to receive the information signal 101, a terminal connected to the adjustment module 321, and a terminal connected to the gain module 341. The summer 332 includes a terminal to receive the information signal 101, a terminal connected to the adjustment module 322, and a terminal connected to the gain module 342. The summer 333 includes a terminal to receive the information signal 101, a terminal connected to the adjustment module 323, and a terminal connected to the gain module 343. The multiplexer 315 includes inputs connected to the gain modules 340-343, a control input, and an output.

The latches 350-353 are connected similarly to the corresponding latches 250-253 of FIG. 2. The multiplexer 316 includes data inputs connected to corresponding data outputs of the latches 351-353, an output, and a control input to receive a signal labeled "Tap Select." The decode module includes an input connected to the data output of the latch 350, an input connected to the data output of the multiplexer 316, and an output connected to the control input of the multiplexer 315.

In FIG. 3, the multiplexers 315 and 316 and the decode module 318 correspond to the selection module 160 of FIG. 1. The decode module 318 is configured to receive the sample stored at latch 350 and the value associated with the sample subset selected among the samples stored at the selected one of latches 351-353. Based on these values, the decode module 318 provides output control signaling to select among the output candidate signals provided by the gain modules 340-343.

To illustrate, in operation the training module 180 determines the Tap Select signal in response to determining a predicted noise pattern. The noise pattern will indicate that one of the samples stored at latches 351-353 corresponds to an ISI symbol. The electronic device 100 sets the Tap Select signal to select the latch indicated by the predicted noise pattern. The decode module 318 uses the value of the sample stored at the selected latch and the value the sample stored at latch 350 to provide control signaling to the multiplexer 315. Based on the control signaling, the multiplexer 315 will select amongst the candidate output signals provided by the gain modules 340-343. In particular, the multiplexer 315 will select the candidate output signal that accounts for the noise predicted by the value of the sample selected from the latches 351-353 and the value of the sample stored at latch 350, thus ameliorating the predicted noise.

Figure 4:
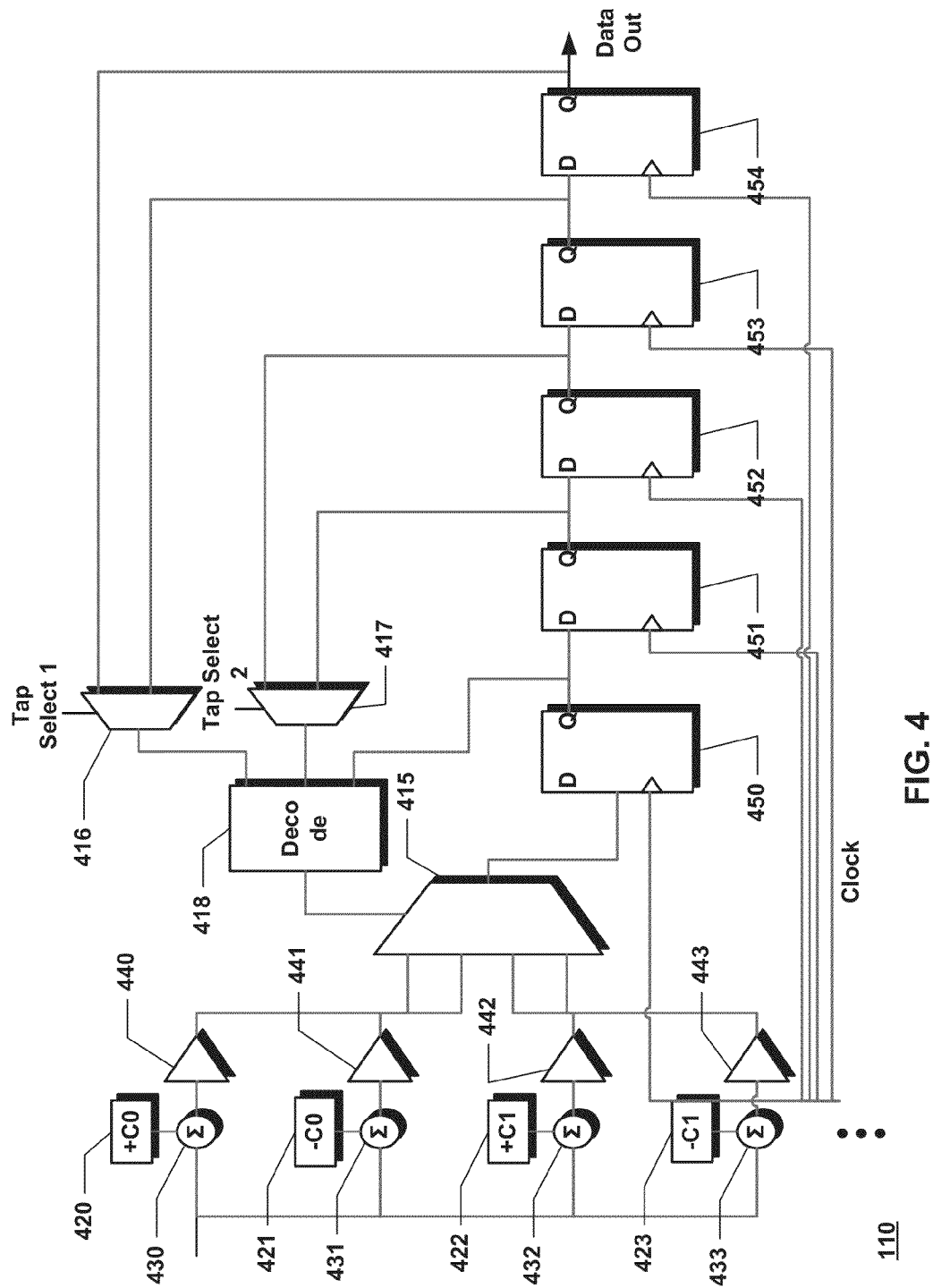
FIG. 4 is a block diagram of the DFE module of FIG. 1 in accordance with some embodiments of the present disclosure.

FIG. 4 illustrates the DFE module 110 in accordance with some embodiments of the present disclosure. As illustrated in FIG. 4, the DFE module 110 includes a fixed tap, the output of latch 450, that is used for every predicted noise pattern, and two variable taps. In FIG. 4, the DFT module 110 includes adjustment modules 420-323, summers 430-433, gain modules 440-443, multiplexers 415-417, latches 450-454, and decode module 418. The summer 430 includes a terminal to receive the information signal 101, a terminal connected to the adjustment module 420, and a terminal connected to the gain module 440. The summer 431 includes a terminal to receive the information signal 101, a terminal connected to the adjustment module 421, and a terminal connected to the gain module 441. The summer 432 includes a terminal to receive the information signal 101, a terminal connected to the adjustment module 422, and a terminal connected to the gain module 442. The summer 433 includes a terminal to receive the information signal 101, a terminal connected to the adjustment module 423, and a terminal connected to the gain module 443. The multiplexer 415 includes inputs connected to the gain modules 440-443, a control input, and an output.

The latches 450-453 are connected similarly to the corresponding latches 250-253 of FIG. 2. The latch 454 includes a data input connected to the output of the latch 453, a clock input to receive the Clock signal, and an output to provide the Data Output signal. The multiplexer 416 includes data inputs connected to corresponding data outputs of the latches 453 and 454, an output, and a control input to receive the signal Tap Select 1. The multiplexer 417 includes data inputs connected to corresponding data outputs of the latches 451 and 452, an output, and a control input to receive the signal Tap Select 1. The decode module includes an input connected to the data output of the latch 450, an input connected to the data output of the multiplexer 416, an input connected to the data output of the multiplexer 417, and an output connected to the control input of the multiplexer 415.

In FIG. 4, the multiplexers 415-417 and the decode module 418 correspond to the selection module 160 of FIG. 1. The decode module 418 is configured to receive the value of the sample stored at the latch 450, the value of the sample stored at the latch selected from latches 451 and 452, and the value of the sample stored at the latch selected from latches 453 and 454. Based on these values, the decode module 418 provides output control signaling to select among the output candidate signals of the gain modules 440-443.

Figure 5:
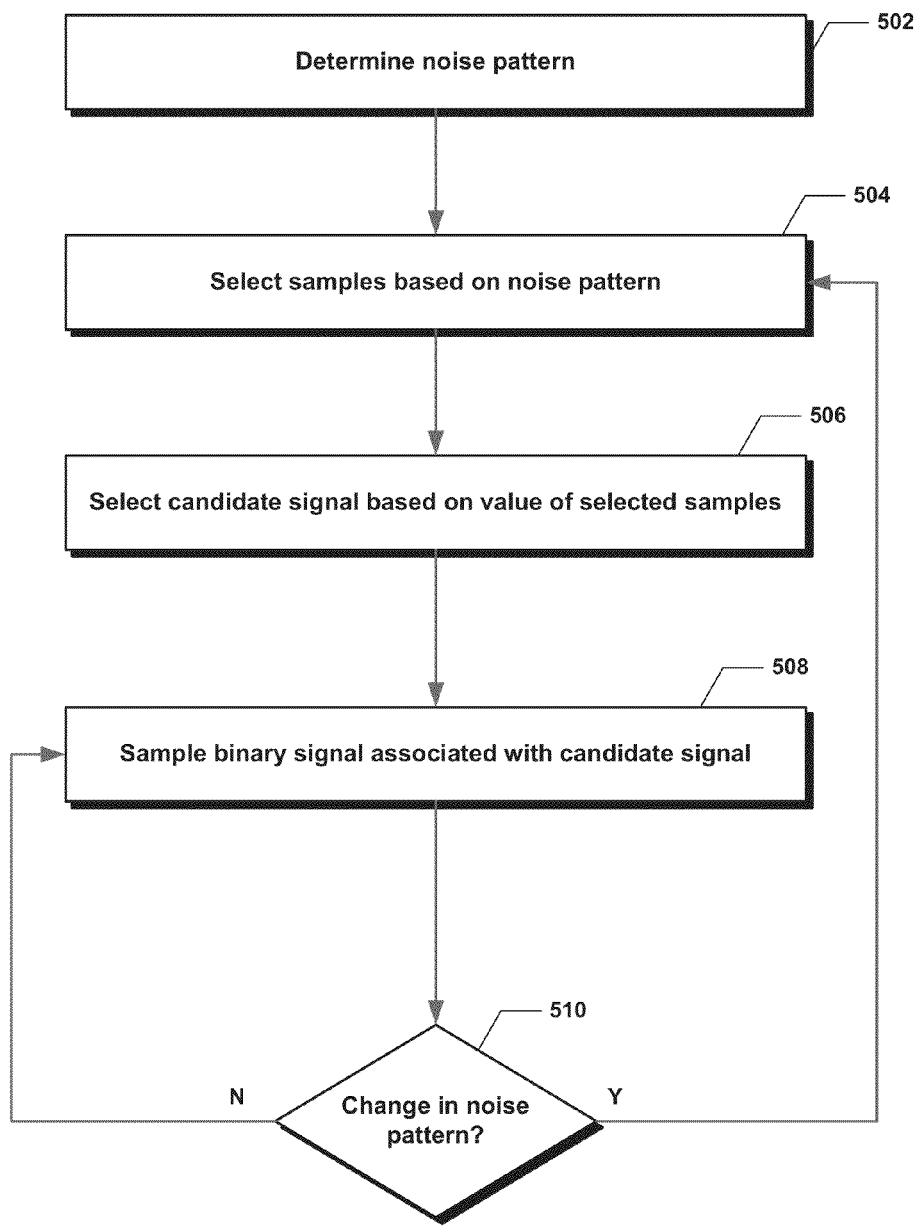
FIG. 5 is a flow diagram of a method of selecting a tap of a DFE module to modify a received signal in accordance with some embodiments of the present disclosure.

FIG. 5 illustrates a flow diagram of a method of selecting a tap at the DFE module 110 in accordance with some embodiments of the present disclosure. At block 502 the training module 180 determines a noise pattern associated with communication of the information signal 101. In response to the determined noise pattern, the electronic device 100 sets the state Tap Select control signaling to indicate the ISI symbols of the noise pattern. At block 504 the selection module 180 selects the samples associated with the ISI symbols from among the samples stored at the latches 150-154. At block 506 the selection module 180 selects one of the candidate signals generated by the summers 130-133 based on the value of the samples selected at block 504. The selection module 180 provides the candidate output signal of the gain module associated with the selected candidate signal to the latch 150. At block 508, in response to assertion of the Clock signal, the latch 150 samples the candidate output signal. At block 510 the training module 180 determines if there has been a change in the noise pattern associated with the information signal 101. This determination can be made in response to a detected change in environmental or operating conditions, in response to a periodic retraining procedure at the electronic device 100, and the like. In response to determining there has not been a change in the noise pattern, the method flow returns to block 508 and the latch 150 continues to sample the selected candidate output signal. If the noise pattern has changed, the method flow returns to block 504 and the training module 180 changes the Tap Select control signaling, thereby changing the selected samples that are used to select the candidate signal.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
   selecting, based on a noise pattern of a signal, a first subset of samples from a sequence of samples generated from the signal;
   selecting, based on the first subset of samples, a first candidate signal from a plurality of candidate signals, each of the plurality of candidate signals representing a different adjustment to the signal; and
   determining a next sample for the sequence of samples based on the selected first candidate signal.

2. The method of claim 1, wherein selecting the first candidate signal comprises selecting the first candidate signal based on the first subset of samples and a first sample of the sequence of samples, the first sample being unavailable for selection for the first subset of samples.

3. The method of claim 2, further comprising:
selecting, based on the noise pattern of the signal, a second subset of samples from the sequence of samples, the second subset of samples being not selectable for the first subset of samples; and
wherein selecting the first candidate signal comprises selecting the first candidate signal based on the first sample, the first subset of samples, and the second subset of samples.

4. The method of claim 1, further comprising:
selecting, based on the noise pattern of the signal, a second subset of samples from the sequence of samples, the second subset of samples being not selectable for the first subset of samples; and
wherein selecting the first candidate signal comprises selecting the first candidate signal based on the first subset of samples and the second subset of samples.

5. The method of claim 1, wherein selecting the first subset comprises selecting the first subset at a first time, and selecting the first candidate signal comprises selecting the first candidate signal at a second time after the first time, the method further comprising:
selecting, at a third time after the second time, a second subset of samples from the sequence of samples generated from the signal;
selecting, based on the second subset of samples, a second candidate signal from the plurality of candidate signals; and
determining another sample of the sequence of samples based on the selected second candidate signal.

6. The method of claim 5, wherein selecting the second candidate signal comprises selecting the second candidate signal in response to determining a change in the noise pattern of the signal.

7. The method of claim 1, further comprising generating the first candidate signal by modifying an amplitude of the signal by a first amount and generating a second candidate signal of the plurality of candidate signals by modifying the amplitude of the signal by a second amount.

8. A method, comprising:
selecting a first candidate signal of a plurality of candidate signals based on a selected subset of a sequence of samples, the plurality of candidate signals generated from a signal, the subset selected based on a noise pattern of the signal; and
sampling the selected first candidate signal to determine a next sample for the sequence of samples.

9. The method of claim 8, wherein generating comprises:
generating the plurality of candidate signals by adjusting the signal by a plurality of adjustment amounts.

10. The method of claim 8, wherein selecting the first candidate signal comprises selecting the first candidate signal in response to a first sample of the subset of the sequence of samples having a first value.

11. The method of claim 10, further comprising:
selecting a second candidate signal from the plurality of candidate signals in response to the subset of the sequence of samples having a second value;
sampling the selected first candidate signal to determine a subsequent sample for the sequence of samples.

12. The method of claim 8, further comprising selecting the subset of the sequence of samples based on a noise test pattern.

13. The method of claim 8, further comprising selecting the first candidate signal based on the selected subset of the sequence of samples and a second sample of the sequence of sample that is not selectable for the selected subset.

14. A device, comprising:
a sequence of latches, each of the sequence of latches to store a corresponding sample of a sequence of samples; and
a selection module comprising:
a first plurality of inputs, each of the first plurality of inputs to receive a corresponding candidate signal of a plurality of candidate signals generated based on a signal;
a second plurality of inputs, each of the second plurality of inputs coupled to a corresponding output of one of the sequence of latches;
an output coupled to an initial latch of the sequence of latches; and
a control input to receive a first control signal indicative of a noise pattern associated with the signal, the selection module to provide a selected one of the plurality of candidate signals at the output based on a data stored at a subset of the sequence of latches, the subset selected based on the control signal.

15. The device of claim 14, further comprising:
an adjustment module to provide an adjustment signal;
a summer comprising an input to receive the signal, an input to receive the adjustment signal, and an output to provide one of the plurality of candidate signals.

16. The device of claim 14, wherein the selection module comprises:
a first multiplexer comprising a plurality of inputs coupled to corresponding outputs of a first subset of the sequence of latches, a control input to receive a first control signal indicative of the noise pattern, and an output.

17. The device of claim 16, wherein the selection module further comprises:
a second multiplexer comprising a control input coupled to the output of the first multiplexer, inputs coupled to corresponding outputs of a plurality of gain modules, and an output coupled to the initial latch of the sequence of latches.

18. The device of claim 17, wherein the selection module further comprises:
a third multiplexer comprising a plurality of inputs coupled to corresponding outputs of a second subset of the sequence of latches, a control input to receive a second control signal indicative of the noise pattern, and an output.

19. The device of claim 16, wherein the first multiplexer comprises an input coupled to an output of a second latch of the sequence of latches, the second latch not included in the first subset.

20. The device of claim 14, wherein each of the plurality of candidate signals represents the signal adjusted for a corresponding predicted amount of noise.

* * * * *